(12) United States Patent
Burton et al.

(10) Patent No.: US 6,650,735 B2
(45) Date of Patent: Nov. 18, 2003

(54) INTEGRATED VOICE ACCESS TO A VARIETY OF PERSONAL INFORMATION SERVICES

(75) Inventors: David Kearney Burton, Sammamish, WA (US); Gayle Ayers Elam, Redmond, WA (US); Simonie Justine Hodges Becker, Snohomish, WA (US); Shawn Domenic Loveland, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/966,170

(22) Filed: Sep. 27, 2001

(65) Prior Publication Data

US 2003/0059000 A1 Mar. 27, 2003

(51) Int. Cl.$^7$ .............................. H04M 1/64; H04M 3/42
(52) U.S. Cl. ................. 379/88.01; 379/67.1; 379/88.04; 379/88.07; 379/88.16; 379/201.01; 379/207.12; 379/201.07
(58) Field of Search ........................... 379/67.1, 68, 69, 379/71, 72, 74, 83, 88.01, 88.02, 88.03, 88.04, 88.07, 88.12, 88.13, 88.16, 88.17, 88.18, 88.22, 88.25, 201.01, 201.02, 201.07, 207.12; 704/243, 260, 275

(56) References Cited

U.S. PATENT DOCUMENTS

| | | | | |
|---|---|---|---|---|
| 5,652,789 A | * | 7/1997 | Miner et al. ................. | 379/201 |
| 5,850,433 A | * | 12/1998 | Rondeau ..................... | 379/201 |
| 5,884,262 A | * | 3/1999 | Wise et al. .................. | 704/270 |
| 5,915,001 A | * | 6/1999 | Uppaluru .................. | 379/88.22 |
| 6,233,317 B1 | * | 5/2001 | Homan et al. ........... | 379/88.05 |
| 6,298,128 B1 | * | 10/2001 | Ramey et al. ......... | 379/142.01 |
| 6,418,199 B1 | * | 7/2002 | Perrone .................... | 379/88.01 |
| 2002/0032589 A1 | * | 3/2002 | Shah ............................. | 705/6 |
| 2002/0164000 A1 | * | 11/2002 | Cohen et al. ............ | 379/88.17 |

OTHER PUBLICATIONS

Title: Speech—enabled information retrieval in the automobile environment Author Muthusamy, Y.; Agarwal, R.; Yifan Gong; Viswanathan, V. Conference Title: 1999 IEEE International Conference on Acoustics, Speech, and Signal Processing. Proceedings. ICASSP99 (Cat. No.99CH36258) Part vol.4 p. 2259–62 vol.4 ISBN: 0 7803 5041 3 Material Identity No.: XX–1999–00747.

Brumbaugh, Randy and Vernon, Todd; Design of a Very-Large Linux Cluster for Providing Reliable and Scalable Speech–to–email Services; *USENIX Association 4$^{th}$ Annual Linux Showcase & Conference, Atlanta*; Oct. 2000, pp. 209–215.

Farren, Paul; Voice Processing: The PC Takes Over?; *Telecommunications*, vol. 28, No. 5, May 1994, pp. 31–33.

Ruimin, Hu; Jun, Peng; and Rong, Zhu; Electronic Mail Voice Assistant (EVA); *High Technology Letters*, vol. 4, No. 1, Jun. 1998, pp. 60–65.

Wolf, Catherine; Koved, Larry; and Kunzinger, Edward; Ubiquitous Mail: Speech and Graphical User Interfaces to an Integrated Voice/E–Mail Mailbox; *Human–Computer Interaction. Interact '95*, pp. 247–252.

* cited by examiner

*Primary Examiner*—Allan Hoosain
(74) *Attorney, Agent, or Firm*—Workman, Nydegger

(57) ABSTRACT

Facilitating voice access to personal information in a manner that the caller may voice command an action to be performed in response to hearing a particular personal information item. The voice commanded action is then automatically performed even if the action requires access to another personal information item of a different type. A voice access server receives a caller-issued voice command to hear a first item of personal information (such as a calendar item) corresponding to a first personal information type. Then, the voice access server automatically accesses the requested information, and audibly speaks the item to the caller. The caller may then submit a voice request to act on the first item of personal information. The voice access server then automatically accesses any other personal information needed to perform the requested action, even if access to a different personal information type is needed.

25 Claims, 5 Drawing Sheets

INTEGRATED VOICE ACCESS TO A VARIETY OF PERSONAL INFORMATION SERVICES

BACKGROUND OF THE INVENTION

1. The Field of the Invention

The present invention relates to methods, systems and computer program products for obtaining integrated voice access to a variety of personal information services such as contacts, calendar, tasks and e-mail services.

2. Background and Related Art

Communication is widely perceived to be an essential human need. It is generally thought that those who master the art of communication are often most likely to develop valuable relationships and otherwise expand their circle of influence in modern society. Perhaps for this reason, inventions that advance our ability to communicate are often perceived to have the largest contribution to our civilization.

The advent of the telephone allowed individuals to audibly communicate in real-time over vast distances. Conventional telephones were "hard-wired" in that the telephonic device relied on a wired connection to communicate over a telephonic network with other telephonic devices. Accordingly, conventional telephones were relatively fixed to a particular location. More recently, mobile telephones have developed thereby allowing individuals to communicate via telephone even if they are not in the proximity of a fixed telephone. Thus, mobile telephones have expanded the ability of individuals to engage in telephonic conversation.

Telephones may now be used not only to engage in telephone conversations, but also to access e-mail via audible voice or tone signals. For example, a call control server may present the telephone user with an audible menu list of items. The telephone user may select a menu item using the audible signal, thereby forwarding the server to a different state (e.g., another menu or a desired service). By navigating through the audible options, the telephone user may access e-mail.

Thus, conventional telephone control systems allow telephone users to access one type of personal information service (namely, e-mail) using audible signals. However, navigation between different types of information such as e-mail, calendar, contacts, and tasks is somewhat awkward in such conventional telephone control systems. Specifically, in order for a telephone user to navigate from an e-mail service to a calendar service, the telephone user would have to navigate out of the e-mail application, enter the calendar service, and navigate to the desired calendar service. Likewise, in order for a telephone user to navigate from a calendar service to an e-mail service, the telephone user would have to navigate out of the calendar application, enter an e-mail application, and navigate to the desired service.

Using a telephone to navigate through services has limitations. First, menu choices are not immediately apparent as they might be with a visual interface. Instead, the user is serially presented with an audible list of items that may be of interest to the telephone user. If the user has not previously memorized a particular list of items, the user must wait until the desired menu item is audibly presented. Also, since it is desirable to keep such a list as short as possible so as to minimize the time involved with presenting the entire menu list, the number of items audibly presented in a telephone menu might be less than the number of options listed using a visual interface.

Accordingly, it may take significantly more time and effort to navigate through an audible telephone interface, as compared to a visual interface. Such time and effort may be especially troublesome if the telephone user is having to engage in other activities such as driving a car or crossing the street while navigating. Thus, having separate applications that manage individual personal information services may be undesirable, especially when accessing such services through a telephone. Therefore, what is desired are methods, systems, and computer program products for integrating voice access to a variety of different types of personal information.

SUMMARY OF THE INVENTION

Methods, systems, and computer program products are described that allow a caller to voice access personal information in a manner that the caller may voice command an action to be performed in response to hearing a particular personal information item. The voice commanded action is then automatically performed even if the action requires access to another personal information item of a different type.

In accordance with the present invention, a voice access server receives a caller-issued voice command to hear a first item of personal information corresponding to a first personal information type. In one example, the voice access server receives a caller-issued voice command to access a particular calendar item. Then, the voice access server automatically accesses the requested information (the calendar item in the example), and audibly speaks the item to the caller.

The voice access server may then maintain a list of acceptable actions to take on the first item of personal information. In the example, several actions may be taken on a calendar item including, for example, obtaining further details about the calendar item, acting on the calendar item by accepting, tentatively accepting, or declining the calendar item, or replying to someone associated with the calendar item.

Some actions may require access to personal information of a different personal information type. For example, when replying to someone associated with the calendar item, it may be necessary to access a telephone number or e-mail address of the person associated with the calendar item. Thus, contacts information needs to be accessed in order to act on calendar information.

Rather than require the caller to voice navigate to the different type of personal information to retrieve the additional item of personal information, the voice access server automatically acquires the additional personal information. For example, the voice access server itself accesses the telephone number or e-mail address to which the reply is to be directed. Thus, the caller is alleviated from tedious voice navigation.

For example, in response to hearing a calendar item, a user may issue a voice command to reply to the organizer of the calendar item. Personal information of another type is then accessed to perform the action. For example, a contacts database may be consulted to acquire the e-mail address or telephone number of the organizer. This occurs without requiring the caller to manually navigate to a separate contacts application. Instead, this is performed automatically for the user. Accordingly, the user is able to perform convenient actions on a personal information item regardless of the type of personal information that needs to be accessed to perform the action.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
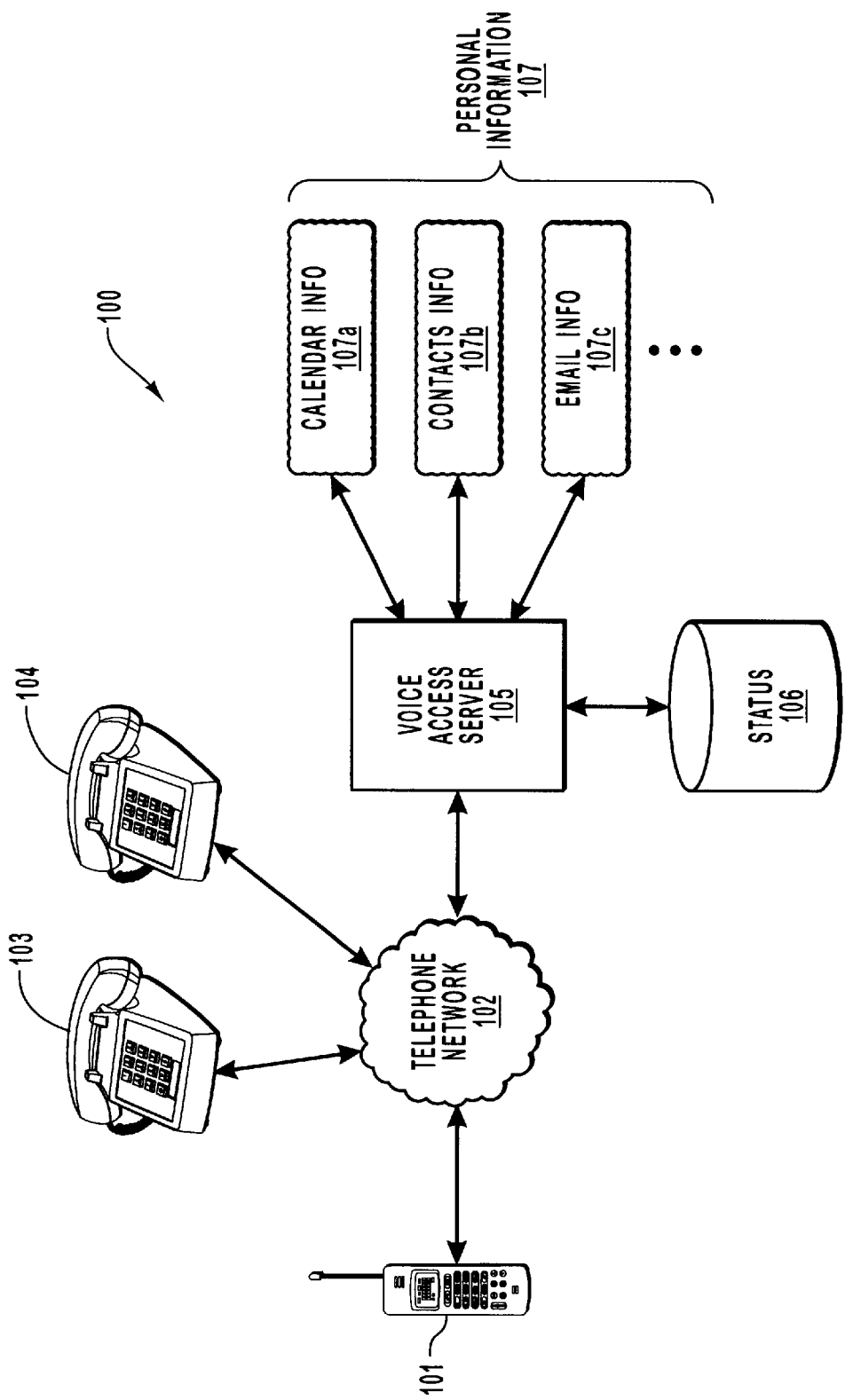
FIG. 1 schematically illustrates a telephone network in which the principles of the present invention may be implemented.

The present invention extends to methods, systems and computer program products for facilitating voice access to personal information in a manner that the caller may voice command an action to be performed in response to hearing a particular personal information item. In this description and in the claims, "voice" includes all audible signals that may be converted into an electrical signal using a telephone. Such audible signals may include, for example, voice or tone (e.g., DTMF) signals.

The voice commanded action is then automatically performed even if the action requires access to another personal information item of a different type. For example, in response to hearing a calendar item, a user may issue a voice command to reply to the organizer of the calendar item. Personal information of another type is then accessed to perform the action. For example, a contacts database may be consulted to acquire the e-mail address or telephone number of the organizer. This occurs without requiring the caller to manually navigate to a separate contacts application. Instead, this is performed automatically for the user. Accordingly, the user is able to perform convenient actions on a personal information item regardless of the type of personal information that needs to be accessed to perform the action.

The embodiments of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps or corresponding acts of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates, in simplified form, an environment 100 in which the present invention may operate. The environment 100 includes a telephone network 102 through which a variety of telephonic devices (such a telephonic devices 101, 103 and 104) may communicate. Throughout this description and in the claims, a "telephonic device" or "telephone" is any device capable of communicating voice information over a telephone network.

The telephone network 102 may be, for example, a conventional Public Switched Telephone Network (also called "PSTN" network). The telephone network 102 may also include cellular networks to allow mobile telephonic devices to communicate over the telephone network 102. Although telephonic device 101 is illustrated as a mobile telephone, and telephonic devices 103 and 104 are illustrated as conventional wired telephones, those skilled in the art will recognize that many devices may fall within the definition of telephonic devices as defined herein such as personal computers and many Personal Digital Assistants (PDAs). The present invention is not limited to use with any particular telephonic device.

A voice access server 105 is a computing device that receives voice requests from the telephonic devices on the telephone network, and allows the caller to use audible voice or tone commands to navigate to personal information 107 belonging to the caller. Such personal information may include information of a variety of different personal information types such as calendar information 107a, contacts information 107b, e-mail information 107c, and the like. Conventionally, when using a voice access server, if a user had navigated to a service of a particular type such as a calendar service, the caller would typically have to exit that service and enter a new service if access to a new service was desired. In accordance with the present invention, once a caller navigates to a particular service item (e.g., a calendar item), the caller may then select an action to perform that requires access to personal information of a different type. Instead of requiring that the caller navigate to this separate service, the voice access server 105 navigates to the new service to acquire any needed information or services. Thus, the caller is spared unnecessary voice navigation.

A database labeled "status" 106 is used to store live information regarding how an action should be performed. For example, suppose a caller issues a voice command to reply to the organizer of the current calendar item. The status database 106 may contain presence information for the organizer that the voice access server 105 may consult to determine the best way to contact the organizer such as, for example, via telephone or e-mail.

The various personal information types are each listed as separate clouds for clarity in describing the invention. It may be that the two or more such personal information types may be managed by a single database and accessed through a single set of access techniques or interfaces. For example, an Exchange database may manage the calendar information 107a as well as contacts information 107b in the form of a Global Address List (GAL) or a Personal Address Book (PAB). On the other hand, the e-mail information 107c may be managed by a Hotmail® service and access via its own access techniques or interfaces.

While some personal address services have been expressly named herein, it is not critical to the present invention the particular brand of service used to maintain the personal information so long as the interfaces used to access the personal information are compatible with the service that manages the personal information. Various information services and their corresponding interfaces are well known to those of ordinary skill in the art, and thus will not be described herein in order to avoid obscuring the principles of the present invention.

The services that manage the personal information may be located on the Internet and/or within a local area network. The voice access server 105 may communicate with these services and the status database 106 using, for example, HyperText Transport Protocol (HTTP) or an extension thereof called HyperText Transport Protocol, Distributed Authoring and Versioning (HTTP-DAV).

Figure 2:
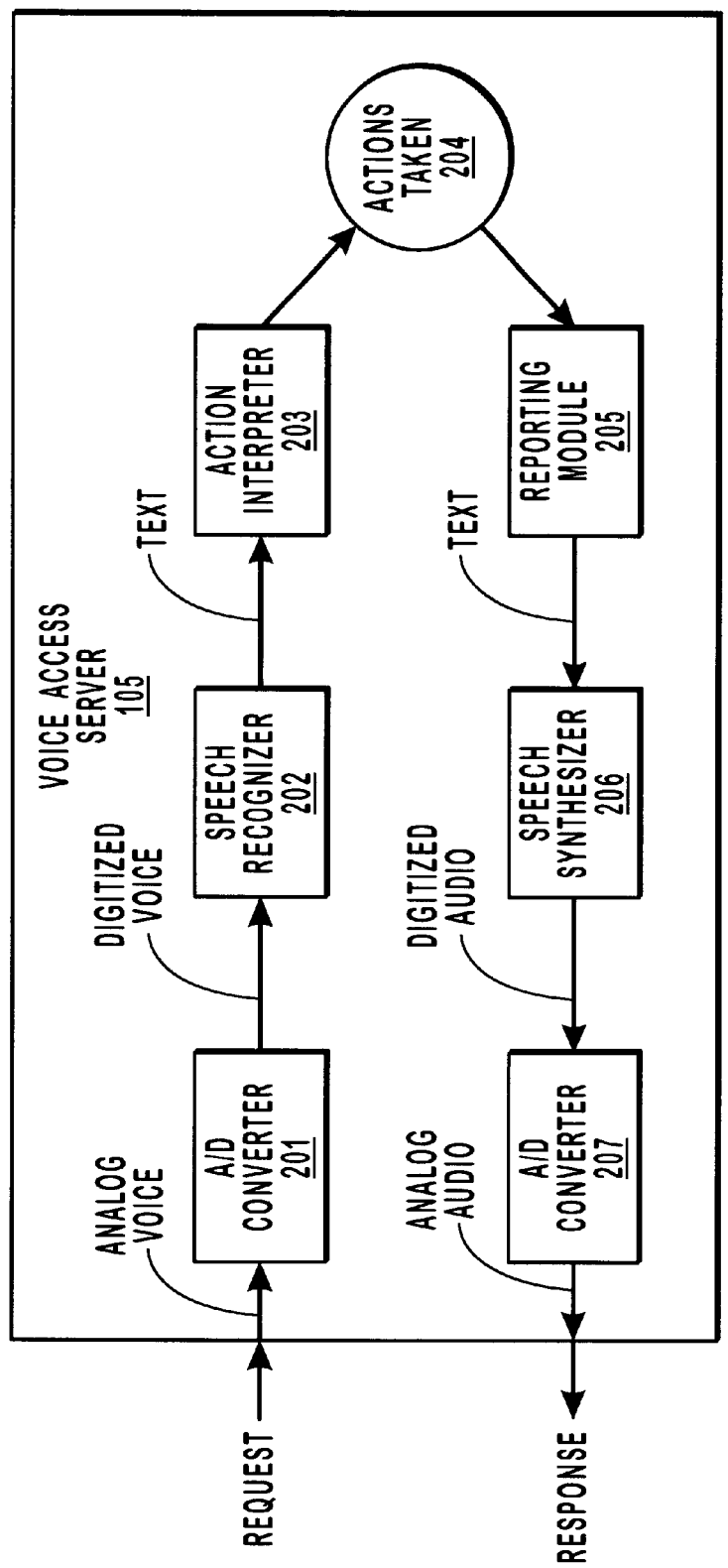
FIG. 2 illustrates relevant components of the voice access server of FIG. 1 in accordance with the present invention.

FIG. 2 illustrates the voice access server 105 in further detail. The voice access server 105 receives voice requests from the telephone network and responds with audio signals transmitted back over the telephone network. If the voice signal is an analog voice signal, an Analog to Digital converter 201 digitizes the voice signal. The digitized voice signal is then provided to a speech recognizer 202, which converts the voice signals into text.

Speech recognition software may be programmed to particularly recognize certain spoken commands. As will be described with respect to FIG. 4, a caller may navigate through the personal information services using only a relatively limited set of spoken words. The speech recognizer 202 may be programmed to recognize these words. The speech recognizer 202 outputs the recognized words in the form of text.

An action interpreter 203 reads the text and then determines an appropriate course of action. The action interpreter 203 then instructs that the actions be taken (represented by circle 204). The voice access server 105 performs the action by accessing personal information 107 if needed.

Often, one of the actions that should be taken is to report back to the caller on the status of the action. Accordingly, a reporting module 205 generates an appropriate text message that should be spoken to the caller.

A speech synthesizer 206 may then convert the text message into digital audio. In one embodiment, a database of digital audio files is persisted in memory. The audio files include a digital recording of the spoken form of each word that could potentially be spoken. A different recording may be recorded for a word depending on the tones and inflections of the word. When a word is evaluated, the word's grammatical position is also evaluated to determine which digital recording best matches the inflections one might expect in natural spoken language given that grammatical position. Once all of the digital recordings for the text message are extracted, they are concatenated for a relatively natural digital representation of the spoken form of the text message. The digital form of the spoken response is then converted to analog form by a digital to analog converter 207, and the analog audio response is then transmitted back to the caller via the telephone network.

Figure 3:
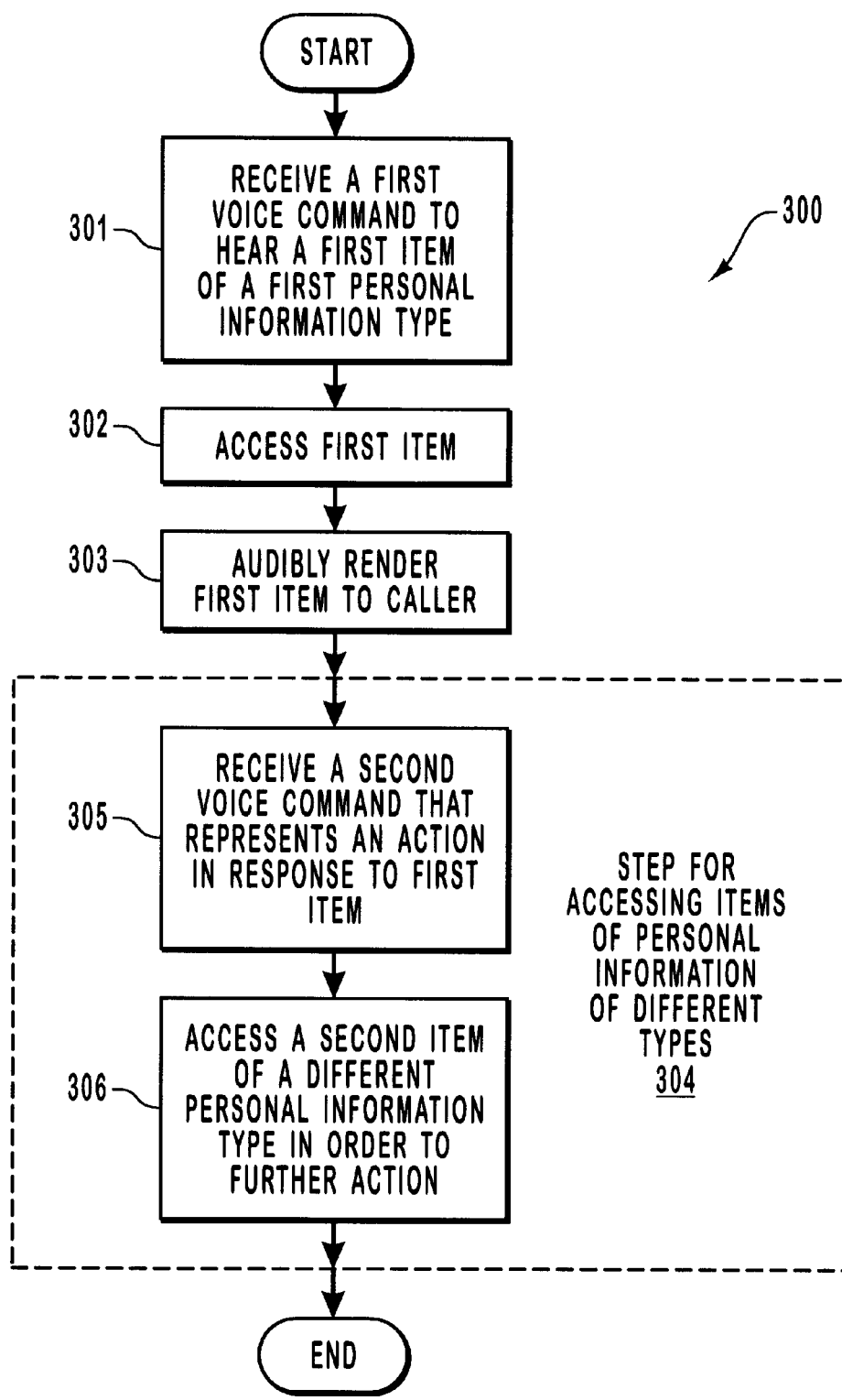
FIG. 3 illustrates a method for allowing a caller to automatically act on an item of personal information via a voice command in accordance with the present invention.

FIG. 3 illustrates a flowchart of an overall method 300 for allowing a caller to perform an action on a personal information item of one type even though performance of the action requires access to another type of personal information. This method may be performed by, for example, the voice access server 105 of FIGS. 1 and 2.

First, the voice access server receives a first caller-issued voice command to hear a first item of personal information corresponding to a first personal information type (act 301). For example, referring to FIG. 1, the caller of the telephonic device 101 may communicate via voice or tone messages with the voice access server 105 to direct the voice access service to a particular calendar item. Then, the voice access server accesses the first item of personal information (act 302), and audibly renders the first item of personal information to the caller (act 303). The voice access server 105 then maintains a list of possible actions that caller may select in response to the first item of personal information.

The voice access server 105 then performs a step for accessing items of personal information of different personal information types in order to allow the caller to flexibly act on the first item of personal information (step 304). In particular, this may involve the voice access server 105 receiving a second caller-issued voice command that represents an action to perform in response to hearing the first item of personal information (act 305). In response, the voice access server 105 automatically accesses a second item of personal information corresponding to a second personal information type without human intervention to further the action (act 306). In other words, the caller did not have to use a series of voice commands to navigate to a different application that manages the second personal information type. Instead, the voice access control server automatically retrieved the necessary personal information.

Figure 4:
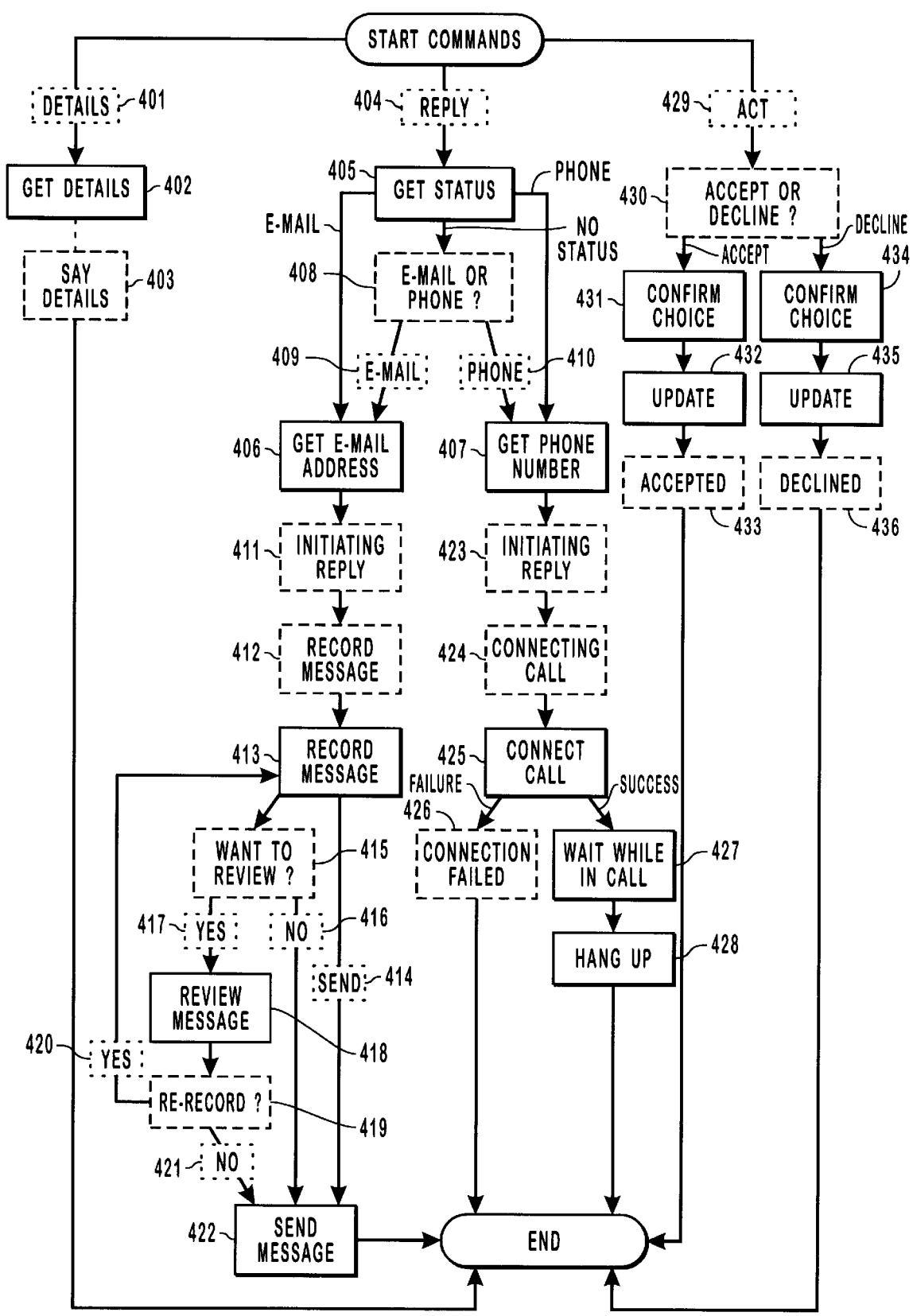
FIG. 4 illustrates a more detailed method for acting on a personal information item (in particular, a calendar item) in accordance with the present invention.

FIG. 4 illustrates a flowchart of a method 400 for allowing a user to act on a particular personal information item, in this case, a calendar item. There are three kinds of boxes in FIG. 4. Dotted-lined boxes represent voice commands issued to the voice access server by the caller. Dashed-lined boxes represent audible responses and prompts spoken by the voice access server back to the caller. Solid-lined boxes represent processing undertaken by the voice access server.

The method begins by assuming that the caller has navigated to a particular calendar item and now wishes to act upon that calendar item. Three actions are listed that the caller may wish to pursue. The caller may desire more details regarding the calendar item, reply to the calendar item, or act on (e.g., accept, decline, tentatively accept) the calendar item.

If the caller says "details" (act 401), then the voice access server gets the details from the calendar information (act 402), and then speaks the details back to the caller (act 403).

The caller may also choose to "act" on a calendar item, in particular, a meeting invitation (act 429). Such acts may include accepting, tentatively accepting, and declining meeting invitations. The voice access server may then ask if the caller wants to accept, tentatively accept, or decline the meeting invitation (act 430). The voice access server then confirms the selection (e.g., act 431 if accepted, act 434 if declined), updates the calendar item (e.g., act 432 if accepted, act 435 if declined), and then speaks the result back to the caller (e.g., act 433 if accepted, act 436 if declined).

If the caller says "reply" (act 404), then the voice access server will facilitate the caller replying to the organizer of the meeting, or the meeting room of the meeting. Suppose, in this example, that the caller is to reply to the organizer of the meeting. The voice access server gets status information (act 405) to determine the best way to currently contact the organizer. The status information may be maintained by, for example, the status database 106 of FIG. 1. The status information may indicate whether e-mail or telephone is the best way to contact the organizer at this time. If there is no status information, or the status information is ambiguous as to which is the best way to contact the organizer, the voice access server may prompt the caller to select the desired means for contact, whether it be by e-mail, or by telephone (act 408).

If the status information indicates that e-mail is the way to contact the organizer, or else the user selects e-mail (act 409), then the voice access server facilitates an e-mail reply to the organizer of the meeting. To do so, the voice access server accesses the contacts information to get the appropriate e-mail address (act 406). Note that although the object that is currently being acted on is a calendar item, an action on the item (i.e., responding to the organizer via e-mail) requires access to a contacts database. The navigation to the contacts database and the acquisition of the appropriate e-mail address is performed automatically by the voice access server, without requiring cumbersome voice navigation of the contacts database.

After the organizer's e-mail address is acquired, the voice access server may speak that it is initiating the reply (act 411). It may then prompt the user to record a message to be included in the e-mail (act 412). The voice access server then records the message spoken by the caller (act 413). After recording, the caller may say "send" (act 414) and the e-mail will be send to the organizer (act 422). Otherwise, the voice access server may ask the caller if he/she desires to review the message. (act 415). If the caller speaks "no" or "send" (act 416), then the message is sent (act 422). If the caller speaks "yes", then the voice access server will speak the message back to the caller (act 418) and ask the caller if he/she wishes to re-record the message (act 419). If the caller speaks "yes" (act 420), then the process returns to act 413 where the caller is given another opportunity to record the message. If the caller indicates that he/she does not wish to review the message (act 421), then the e-mail message is sent (act 422).

The voice access server may also be used to have the caller place a telephone call to the organizer. This may occur if the status information indicates that the telephone is the best way to currently contact the organizer or if the caller says that he/she wishes to call the organizer on the telephone (act 410). In response, the voice access server accesses the contacts information to get the organizer's telephone number (act 407). The telephone number may be dynamic in that the telephone number to the meeting room may be given during the meeting time, and otherwise, the office telephone number of the organizer is given. Note again, that the caller need not navigate to the contacts database to get the telephone number.

The voice access server may then indicate that it is initiating a reply (act 423), and then that it is connecting the call (act 424), and then the voice access server connects the call (act 425). More regarding methods for connecting the call are described further below. If the connection attempt failed, then the voice access service indicates the failure to the caller (act 426), and the process ends. If the connection succeeds, then the voice access server waits while the call is connected (act 427) and then hangs up the call (act 428).

There are several methods that the voice access server may use to connect the call (act 425). Each has advantages and disadvantages. One connection method is referred to as "tromboning". In particular, the established telephone call between the caller and the voice access server is maintained throughout. In addition, the voice access server establishes a separate telephone call with the organizer. The two calls are then connected as a conference call, thus allowing the caller to communicate with the organizer. Then, the voice access server waits for the conversation to end (act 427), and then disconnects the telephone call between the voice access server and the organizer (act 428). However, the telephone call between the caller and the voice access server may continue thus allowing the caller to continue accessing personal information. Although this method allows for quick connections to the organizer, the voice access server must maintain two telephone calls in order to provide tromboning. Accordingly, the tromboning method does not efficiently use a limited amount of available telephone connections.

In another method, the voice access server sends a data or text message (e.g., an SMS message) to the caller's telephonic device providing the organizer's telephone number and instructing the telephonic device to hang up and dial the telephone number of the organizer. This requires that the caller's telephonic device be capable of interpreting such messages, which is not always the case. Also, such messages may take considerable time to reach the telephonic device. Accordingly, it may take significant time for the telephonic device to be able to connect with the organizer's telephone number.

If the voice access server has a relationship with the carrier, is or implemented by the carrier, the voice access server may establish the connection using an SS7-SIP interface that is used by PSTN telephone carriers. Using this interface, the voice access server may instruct the telephone network to disconnect the telephone call from the voice access server, and reconnect the telephone call to the organizer.

Thus, FIG. 4 illustrates a scenario in which a user acts on a calendar item, where the action requires access to contacts information such as e-mail addresses and telephone numbers. The user thus acts on the calendar item without having to go through the cumbersome process of using a series of voice commands to navigate to the contacts information to find out the e-mail address or telephone number, then navigate to an e-mail service to send an e-mail, or physically place a telephone call to the user. Instead, the voice access server automatically obtains the contacts information and facilitates the e-mail reply or telephone call.

However, acting on a calendar item is by no means the only scenario enabled by the present invention. For example, a user may navigate to read a particular e-mail, and then choose to reply to the e-mail by a telephone call. The voice access server may then search the contacts information for the identity of the e-mail sender, and the corresponding telephone number. The voice access server may then connect with the telephone number in the same manner as described above for act 425.

Accordingly, the principles of the present invention allow for more convenient and integrated caller access to personal information services. In particular, a user may act on a personal information item even if such access requires access to other types of personal information, and without the caller having to worry about accessing the other types of personal information.

Figure 5:
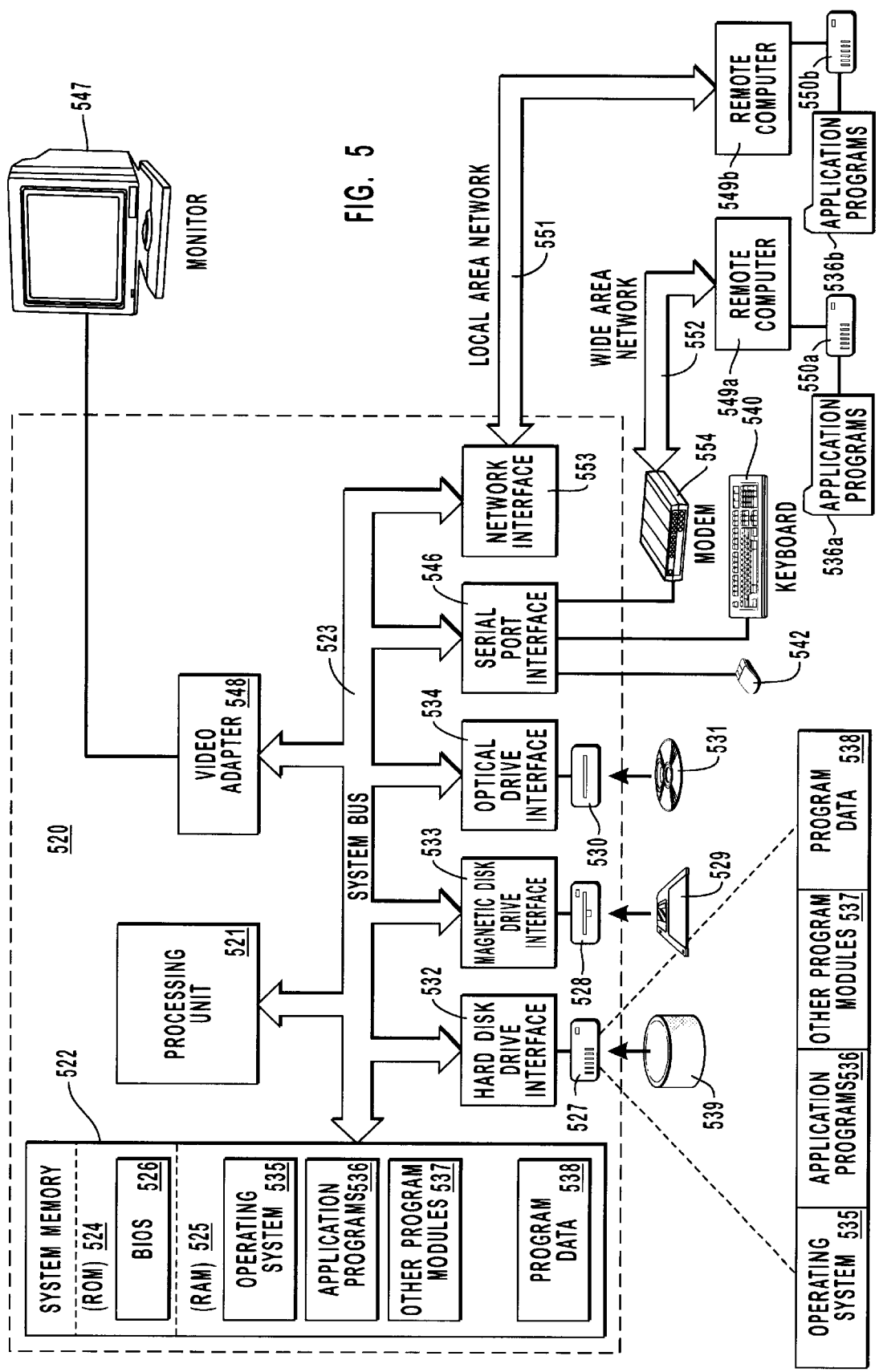
FIG. 5 illustrates an example computing system that represents a suitable operating environment for the voice access server.

Having now described the principles of the present invention in detail, it is noted that the precise hardware configuration that implements the above-described features is not important to the present invention. Nevertheless, for the sake of completeness, FIG. 5 illustrates an example computing system that may itself or in combination with other computing devices implement the voice access server 105 of FIG. 1.

The example system includes a general purpose computing device in the form of a conventional computing device 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531 such as a CD-ROM or other optical media. The magnetic hard disk drive 527, magnetic disk drive 528, and optical disk drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. For example, the application programs 536 may include the speech recognizer 202, the action interpreter 203, and the speech synthesizer 205. In addition, the application programs 536 may perform the actions resulting from the action interpreter to thereby accomplish the caller's objectives.

A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used. The modem 554 may also be used to receive the analog voice commands from the caller, and transmit the audio responses back to the caller via the telephone network 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computing system comprising a voice access server that provides one or more telephonic devices with voice access to one or more separate and distinct remote services which manage personal information of a plurality of personal information typos, a computerized method for allowing a caller to perform an action, via a voice command, on an item of personal information that is accessed with a first service and that requires access to another item of personal information of a different personal information type that is accessed with one or more other services that are each separate and distinct from the first service, and without the user explicitly navigating to the one or more other services to access the other item, the method comprising the following:

an act of the voice access server receiving a first caller-issued voice command to hear a first item of personal information corresponding to a first personal information type that is accessed with a first service;

an act of the voice access server determining an action to be taken in order to access the first item of personal information with the first service in response to the first caller-issued command, and reporting back to the caller, if appropriate, a status of the action;

an act of the voice access server audibly rendering the first item of personal information to the caller when the determined action is taken;

an act of the voice access server receiving a second caller-issued voice command that represents an action to perform in response to hearing the first item of personal information, wherein the action requires access to a second item of personal information corresponding to a second personal information type that has not been previously associated with the first item of personal information and that can be accessed with one or more other services that are each separate and distinct from the first service; and in response to the second caller-issued voice command, an act of determining a further action to he taken and then if the further action is taken, automatically accessing the second item of personal information from the one or more other services that are each separate and distinct from the first service and without the user explicitly navigating to the one or more other services to access the second item of personal information via additional voice commands, and if the further action is not taken, reporting that back to the caller, if appropriate.

2. A method in accordance with claim 1, wherein the first item of personal information comprises a calendar item corresponding to a calendar personal information type.

3. A method in accordance with claim 2, wherein the act of receiving a second caller-issued voice command comprises an act of receiving a caller-issued voice command to send an e-mail to someone associated with the calendar item.

4. A method in accordance with claim 3, wherein the act of receiving a caller-issued voice command to send an e-mail to someone associate with the calendar item comprises an act of receiving a caller-issued voice command to send an e-mail to an organizer of the calendar item.

5. A method in accordance with claim 3, wherein the act of automatically accessing the second item of personal information comprises an act of automatically accessing an e-mail address of the someone associated with the calendar item.

6. A method in accordance wit claim 2, wherein the act of receiving a second caller-issued voice command comprises an act of receiving a caller-issued voice command to place a telephone call to someone associated with the calendar item.

7. A method in accordance with claim 6, wherein the act of receiving a caller-issued voice command to place a telephone call to someone associated with the calendar item comprises an act of receiving a caller-issued voice command to place a telephone call to an organizer of the calendar item.

8. A method in accordance with claim 6, wherein the act of automatically accessing the second item of personal information comprises an act of automatically accessing a telephone number of the someone associated with the calendar item.

9. A method in accordance with claim 1, wherein the first item of personal information comprises an e-mail.

10. A method in accordance with claim 9, wherein the act of receiving a second caller-issued voice command comprises an act of receiving a caller-issued voice command to place a telephone call to the sender of the e-mail.

11. A method in accordance with claim 10, wherein the act of automatically accessing the second item of personal information comprises an act of automatically accessing a telephone number associated with the sender of the e-mail.

12. A computer program product for use in a computing system comprising a voice access server that provides one or more telephonic devices with voice access to one or more separate and distinct remote services which manage personal information of a plurality of personal information types, the computer program product for implementing a method for allowing a caller to perform an action, via a voice command, on an item of personal information that is accessed with a first service and that requires access to another item of personal information of a different personal information type that is accessed with one or more other services that are each separate and distinct from the first service, and without the user explicitly navigating to the one or more services to access the other item, the computer program product comprising one or more computer-readable media having stored thereon the following:

computer-executable instructions for detecting the receipt of a first caller-issued voice command to hear a first item of personal information corresponding to a first personal information type that is accessed with a first services;

computer-executable instructions for determining an action to be taken in order to access the first item of personal information with the first service in response to the first caller-issued command, and for reporting back to the caller, if appropriate, a status of the action;

computer-executable instructions for audibly rendering the first item of personal information to the caller when the determined action is taken;

computer-executable instructions for detecting the receipt of a second caller-issued voice command that represents an action to perform in response to hearing the first item of personal information, wherein the action requires access to a second item of personal information, corresponding to a second personal information type, that has not been previously associated with the first item of personal information and that can be accessed with one or more other services that are each separate and distinct from the first service; and computer-executable instructions for, in response to the second caller-issued voice command, determining a further action to be taken and then if the further action is taken, automatically accessing the second item of personal information from the one or more other service that are each separate and distinct from the first service and without the user explicitly navigating to the one or more other service to access the second item of personal information via additional voice commands, and if the further action is not taken, reporting that back to the caller, if appropriate.

13. A computer program product in accordance with claim 12, wherein the first item of personal information comprises a calendar item corresponding to a calendar personal information type.

14. A computer program product in accordance with claim 13, wherein the computer-executable instructions for detecting the receipt of a second caller-issued voice command comprise computer-executable instructions for detecting the receipt of a caller-issued voice command to send an e-mail to someone associated with the calendar item.

15. A computer program product in accordance with claim 14, wherein the computer-executable instructions for detecting the receipt of a caller-issued voice command to send an e-mail to someone associate with the calendar item comprise computer-executable instructions for detecting the receipt of a caller-issued voice command to send an e-mail to an organizer of the calendar item.

16. A computer program product in accordance wit claim 14, wherein the computer-executable instructions for accessing the second item of personal information comprise computer-executable instructions for accessing an e-mail address of the someone associated with the calendar item.

17. A computer program product in accordance with claim 13, wherein the computer-executable instructions for detecting the receipt of a second caller-issued voice command comprise computer-executable instructions for detecting the receipt of a caller-issued voice command to place a telephone call to someone associated with the calendar item.

18. A computer program product in accordance with claim 17, wherein the computer-executable instructions for detecting the receipt of a caller-issued voice command to place a telephone call to someone associated with the calendar item comprise computer-executable instructions for detecting the receipt of a caller-issued voice command to place a telephone call to an organizer of the calendar item.

19. A computer program product in accordance with claim 17 the computer-executable instructions for accessing the second item of personal information comprise computer-executable instructions for accessing a telephone number of the someone associated with the calendar item.

20. A computer program product in accordance with claim 12, wherein the first item of personal information comprises an e-mail.

21. A computer program product in accordance with claim 20, wherein the computer-executable instructions for detecting the receipt of a second caller-issued voice command comprise computer-executable instructions for detecting the receipt of a caller-issued voice command to place a telephone call to the sender of the e-mail.

22. A computer program product in accordance with claim 21, wherein the computer-executable instructions for accessing the second item of personal information comprise computer-executable instructions for accessing a telephone number associated with the sender of the e-mail.

23. A computer program product in accordance with claim 12, wherein the one or more computer-readable media arc physical storage media.

24. In a computing system comprising a voice access server that provides one or more telephonic devices with access to one or more separate and distinct remote services which manage personal information of a plurality of personal information types, a method for allowing a caller to perform an action, via a voice command, on an item of personal information tat requires access to another item of personal information that is of a different personal information type, without explicitly navigating to the other item, the method comprising the following:

an act of receiving a first caller-issued voice command to hear a first item of personal information corresponding to a first personal information type;

an act of determining an action to be taken in order to access the first item of personal information train one or more separate and distinct remote services in response to the first caller-issued command, and reporting back to the caller, if appropriate, a status of the action;

an act of audibly rendering the first item of personal information to the caller when the determined action is taken; and a step for determining a further action to be taken and then if the further action is taken, automatically accessing other items of personal information of different personal information types from the one or more separate and distinct remote services, which have not been previously associated with the first item of personal information, in order to allow the caller to act on the first item of personal information without explicitly navigating to the other items of personal information via additional voice commands, and if the further action is not taken, reporting that back to the caller, if appropriate.

25. A method in accordance with claim 24, wherein the step for accessing items of personal information comprise the following corresponding acts:

an act of receiving a second caller-issued voice command that represents an action to perform in response to hearing the first item of personal information; and an act of automatically accessing a second item of personal information corresponding to a second personal information type without human intervention to further the action.

* * * * *

UNITED STATES PATENT AND TRADEMARK OFFICE
CERTIFICATE OF CORRECTION

PATENT NO. : 6,650,735 B2
DATED : November 18, 2003
INVENTOR(S) : Burton et al.

It is certified that error appears in the above-identified patent and that said Letters Patent is hereby corrected as shown below:

Column 8,
Line 5, after "will be" please delete "send" and insert -- sent --
Line 16, after "used to" please delete "have" and insert -- having --

Column 9,
Line 2, after "carrier," please delete "is or" and insert -- or is --

Column 11,
Line 49, after "action to" please delete "he" and insert -- be --
Line 67, after "someone" please delete "associate" please insert -- associated --

Column 12,
Line 8, after "accordance" please delete "wit" and insert -- with --
Line 53, please delete "services;" and insert -- service --

Column 13,
Line 11, after "more other" please delete "service" and insert -- services --
Line 29, after "someone" please delete "associate" and insert -- associated --
Line 33, after "accordance" please delete "wit" and insert -- with --

Column 14,
Line 11, after "media" please delete "arc" and insert -- are --
Line 19, after "information" please delete "tat" and insert -- that --
Line 29, after "information" please delete "train" and insert -- from --

Signed and Sealed this

Seventh Day of September, 2004

JON W. DUDAS
*Director of the United States Patent and Trademark Office*